(12) United States Patent
Coussonnet et al.

(10) Patent No.: US 10,609,536 B2
(45) Date of Patent: Mar. 31, 2020

(54) SYSTEM FOR ASSOCIATING AT LEAST ONE PHYSICAL MEDIUM WITH A BASE FOR STORING DIGITAL DATA

(71) Applicant: REVIVE SAS, Saint Sauveur (FR)

(72) Inventors: Laurent Coussonnet, Aubiere (FR); Emmanuel Ranc, Clermont-Ferrand (FR)

(73) Assignee: REVIVE SAS, Saint-Sauveur (FR)

( * ) Notice: Subject to any disclaimer, the term of this patent is extended or adjusted under 35 U.S.C. 154(b) by 188 days.

(21) Appl. No.: 15/373,027

(22) Filed: Dec. 8, 2016

(65) Prior Publication Data

US 2018/0070197 A1    Mar. 8, 2018

(30) Foreign Application Priority Data

Sep. 8, 2016 (FR) ..................... 16 01327

(51) Int. Cl.
| | |
|---|---|
| *H04W 4/80* | (2018.01) |
| *G06F 16/632* | (2019.01) |
| *G06F 16/68* | (2019.01) |
| *G06F 21/10* | (2013.01) |
| *G07G 1/00* | (2006.01) |
| *G06Q 20/32* | (2012.01) |
| *H04L 29/06* | (2006.01) |
| *G06K 7/10* | (2006.01) |
| *H04L 29/08* | (2006.01) |

(52) U.S. Cl.
CPC ............ *H04W 4/80* (2018.02); *G06F 16/632* (2019.01); *G06F 16/686* (2019.01); *G06F 21/10* (2013.01); *G06K 7/10237* (2013.01); *G06Q 20/3278* (2013.01); *G07G 1/009* (2013.01); *H04L 63/10* (2013.01); *H04L 67/1097* (2013.01)

(58) Field of Classification Search
CPC .......................... H04L 63/10; G06K 7/10237
See application file for complete search history.

(56) References Cited

U.S. PATENT DOCUMENTS

| | | | | |
|---|---|---|---|---|
| 8,131,263 | B2* | 3/2012 | Endrikhovski | G06Q 10/087 340/10.5 |
| 8,441,338 | B2* | 5/2013 | Naressi | G06F 21/10 235/375 |
| 8,589,505 | B2* | 11/2013 | Kridner | G06F 16/955 709/217 |
| 8,659,389 | B2* | 2/2014 | Nasser | H04Q 9/00 340/1.1 |
| 8,988,198 | B2* | 3/2015 | Pesonen | H04B 5/00 340/10.1 |
| 9,165,233 | B2* | 10/2015 | Testanero | G06K 19/0723 |

(Continued)

*Primary Examiner* — Lashonda T Jacobs
(74) *Attorney, Agent, or Firm* — Dowell & Dowell, P.C.

(57) ABSTRACT

The system for associating at least one physical medium (5) itself associated with at least one file containing at least audio data, with a base (1) for storing digital data comprises:
 a management and control module (6) of the device,
 a base (1) for storing digital data of at least one audio file, said file corresponding to a digital version of an audio file initially associated with at least one physical medium (5),
 means (3) for reading said audio file in digital form connected to the database (1) by a cable or wireless link (F3),
 a member (4) fixed to said physical medium (5) and storing information necessary for reading at least one audio file stored in digital form in said database (1) by said reading means (3).

7 Claims, 1 Drawing Sheet

(56) References Cited

U.S. PATENT DOCUMENTS

| | | | |
|---|---|---|---|
| 9,514,782 B2* | 12/2016 | Hershey | G11B 19/122 |
| 10,319,203 B1* | 6/2019 | Testanero | G08B 13/2434 |
| 2006/0132309 A1* | 6/2006 | Posamentier | G11B 19/122 |
| | | | 340/572.1 |
| 2008/0199006 A1* | 8/2008 | Gandolph | G06F 21/10 |
| | | | 380/201 |
| 2008/0207307 A1* | 8/2008 | Cunningham, II | G06Q 20/105 |
| | | | 463/25 |
| 2011/0288946 A1* | 11/2011 | Baiya | G06F 21/10 |
| | | | 705/26.1 |
| 2012/0210118 A1* | 8/2012 | Chaves | G06F 21/6218 |
| | | | 713/150 |
| 2012/0311723 A1* | 12/2012 | Britt, Jr. | G06Q 30/06 |
| | | | 726/28 |
| 2013/0076765 A1* | 3/2013 | Nam | G06T 1/00 |
| | | | 345/522 |
| 2013/0166911 A1* | 6/2013 | Daouphars | H04L 9/3218 |
| | | | 713/168 |
| 2013/0179676 A1* | 7/2013 | Hamid | H04L 9/08 |
| | | | 713/150 |
| 2013/0219164 A1* | 8/2013 | Hamid | H04L 63/0485 |
| | | | 713/150 |
| 2014/0201164 A1* | 7/2014 | Skinder | G06F 16/957 |
| | | | 707/687 |
| 2014/0277648 A1* | 9/2014 | Chong | H04H 60/65 |
| | | | 700/94 |
| 2015/0193765 A1* | 7/2015 | Gadotti | G06Q 20/3276 |
| | | | 705/39 |
| 2015/0254677 A1* | 9/2015 | Huxham | G06K 19/0709 |
| | | | 705/57 |
| 2015/0347839 A1* | 12/2015 | Hagen | G06K 7/10386 |
| | | | 382/187 |
| 2016/0283764 A1* | 9/2016 | Benson | G06F 16/9554 |
| 2017/0124363 A1* | 5/2017 | Rietzler | G06Q 10/08 |
| 2017/0272472 A1* | 9/2017 | Adhar | H04L 63/205 |
| 2017/0289224 A1* | 10/2017 | Moon | H04B 5/0031 |
| 2018/0198610 A1* | 7/2018 | Mullins | H04L 9/14 |

* cited by examiner

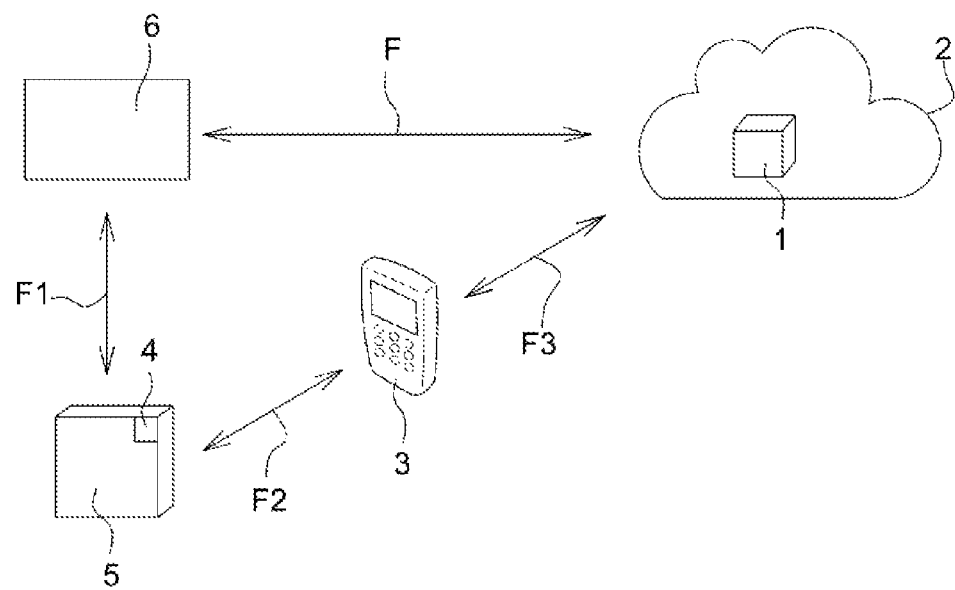

SYSTEM FOR ASSOCIATING AT LEAST ONE PHYSICAL MEDIUM WITH A BASE FOR STORING DIGITAL DATA

BACKGROUND OF THE INVENTION

The present invention concerns a system for associating at least one physical medium with a base for storing digital data.

In the context of the invention, the physical medium is itself associated with at least one file containing at least audio data.

Here the expression "physical medium associated with at least one audio file" must be understood as designating a physical, in the sense of real, object that contains, represents, illustrates or evokes at least one, advantageously more than one, audio file. Here the expression "audio file" must be understood as designating a file containing at least sound data, termed audio data, such as songs, music, the human voice or natural sounds, for example the sound of wind, waves or animal cries. In the context of the invention and by way of nonlimiting example, a medium of this is an audio cassette, a vinyl disk, a CD, a DVD, a VHS cassette, a packaging, a case, a box or a decorative object. It is clear that a medium of this kind may contain or be associated with other types of data, notably image and/or video files associated or not with the audio file.

In the context of the present invention a base for storing digital data means a database for storing and hosting for subsequent use audio, image and/or video files in digital form. A database of this kind is for example accessible via a cable or wireless communication network. In the latter case the database is for example accessible via a communication network such as a GSM network or via the Internet. In all cases, the database is distinct from and independent of the medium containing or associated with an audio file.

At present it is commonplace to access bases for storing digital data using wireless communication means, frequently so-called nomadic or mobile means. The means most frequently used include smartphones, tablets, computers, MP3 players, etc. These means make possible, in a small overall size, to read anywhere and at any time files, notably audio files, the number of which may be as high as several thousand. With such means, the files are either stored on a remote server, for example via the computing cloud, or on the means themselves, via an SD card or the internal memory of the means.

While such access means for reading and storing audio files have numerous advantages, they can only store and play back files having an appropriate format. In other words, non-digital files are not managed by such means. To remedy this there are known systems, often offered in the form of services by specialized structures, that handle the conversion to the digital format of the data of audio files. It is then possible to profit from the nomadic reading possibilities offered by reading means, with digital quality, for audio data that is initially not digital.

This being the case, use of such a solution is irksome because it is necessary for the user to start by digitizing their audio files, not to mention the cost of this service. The service life of current audio file media, for example DVD or CD, being limited, the marketing of these files is increasingly effected in a virtual manner via access to remote service. Because of this, the consumer no longer has a permanent physical object that materializes the file or files. Moreover, it is frequently the case that the non-digital audio data is originally stored on media which are either of interest as such or provide storage of other, also non-digitized information. By way of example there may be cited a vinyl disk sleeve with graphics, photos, a score, a booklet, etc. Moreover the user may for personal reasons be fond of the medium. In other words, digitization systems make it possible only to digitize data. The medium is not taken into account and becomes de facto useless. Now, there exist audio file media which, as such, have a high commercial and/or sentimental value, which implies their preservation.

It is these disadvantages that the invention more particularly intends to remedy by proposing a system for associating at least one physical medium of at least one audio file with a base for storing digital data making possible both the preservation of the medium and the use of digitized data based on the data of the audio files stored on the medium.

BRIEF SUMMARY OF THE INVENTION

To this end, the invention consists in a system for associating at least one physical medium, said medium itself being associated with at least one file containing at least audio data, with a base for storing digital data, characterized in that it comprises:
  a management and control module of the device,
  a base for storing digital data of at least one file containing at least audio data, said file corresponding to a digital version of a file containing at least audio data initially associated with at least one physical medium,
  means for reading said file containing at least audio data in digital form connected to the database by a cable or wireless link,
  a member fixed to said physical medium and storing information necessary for reading at least one file containing at least one audio data stored in digital form in said database by said reading means.

According to advantageous but not obligatory aspects of the invention, a system of the above kind may have one or more of the following features:
  The member is an RFID (Radio Frequency Identification) type label.
  The physical medium is chosen from at least DVD, CD, cassette, VHS cassette or vinyl disk.
  The reading means are chosen from at least smartphones, tablets.
  The reading means are integral with the database.
  The reading means are remote from the database, the latter being hosted in the computing cloud.

BRIEF DESCRIPTION OF THE SEVERAL VIEWS OF THE DRAWING

The invention will be better understood and other advantages thereof will become more clearly apparent on reading the following description of a number of embodiments of the invention given by way of nonlimiting example and with reference to the following drawing in which:
  FIG. 1 is a simplified diagram of the system.

DETAILED DESCRIPTION OF THE INVENTION

The base 1 for storing data is hosted on a server remote from the other constituent elements of the system. Hereinafter, to facilitate readability, the expression "database" will also be used. This server is accessible via a wireless communication network, typically via a 3G, 4G network or via the Internet. In other words, the database 1 is advantageously hosted in the computing cloud 2 or virtual computer. In a variant that is not shown, the database 1 is situated on a server connected by cable to the other elements of the system. A database of this kind hosts not only files containing audio data in digital form but also other types of digital files, for example files containing video data or images. A base of this kind is advantageously dedicated to the invention. In other words, a base of this kind is adapted not to be used outside the context of the invention, which optimizes the security of the system. Alternatively, it is a known and existing database that already stores so-called audio files. Bases of this kind are known that supply on demand, for example with a subscription system, so-called audio files such as songs or pieces of music.

The means 3 for reading said audio file advantageously comprise mobile means, such as a smartphone, a phablet, thus a smartphone with a screen size close to that of a tablet, typically more than 6 inches. The reading means 3 communicate via a GSM network or via the Internet network with the database 1 situated in the computing cloud 2 and hosting the audio files. In a variant that is not shown, the reading means are fixed or at least difficult to move around for a nomadic use. This typically means a computer, or even a tablet or a dedicated device of jukebox type. Alternatively, the reading means are integral with the means hosting the database or at least connected to the latter by a cable connection.

A member 4 is fixed permanently or otherwise to a physical medium 5 on which is stored or with which is associated initially at least one file containing audio data. A medium 5 of this kind is for example a vinyl disk, a CD, a DVD, an audio cassette, a VHS cassette, etc. Here the medium 5 is diagrammatically illustrated by a parallelepiped.

The member 4, fixed to the medium 5, takes the form of a label, i.e. a member of small thickness compared to its other dimensions, light in weight, of sufficiently small overall size to be fixed to a portion of the medium 5, advantageously without significantly modifying the overall appearance of the medium 5.

The member 4 is preferably but not exclusively an RFID (Radio Frequency iDentification) label that comprises an adhesive part, an electronic chip which is preferably but not obligatorily a secure electronic chip, i.e. encrypted and copy-protected and an antenna. A label 4 of this kind makes possible communication between devices over a short distance. The distance separating the devices is less than 20 m and of the order of a few tens of centimeters for one particular type of such labels called an NFC (Near Field Communication) label.

A label 4 of this kind conforms to an international standard which ensures wide distribution at the worldwide level. In fact, at least 70% of smartphones, and thus of the reading means, are today able to communicate with RFID labels. Accordingly, the reading means 3, when this preferably means a smartphone, are adapted on the one hand to communicate with an RFID label fixed to the medium 5 and on the other hand to communicate with the remote database 1.

The adhesive part of the RFID label facilitates fixing to any type of medium, for example to a polymer, glass or cardboard. Alternatively, the RFID label is integrated into the material constituting the medium 5. It is then impossible to separate the label from the medium without damaging the label and/or the medium, all the more so in that the integration may be effected so as not to be detectable by an unaware user. In other words, the label is concealed in the medium and its presence is not visually detectable.

As seen in FIG. 1, the system also includes a management and control module 6 of the system. This module 6 is advantageously an HSM (Hardware Security Module) type module. This is advantageously a device that has highly significant security features that render it virtually tamper-proof. A module 6 of this kind makes it possible to generate, store and protect cryptographic keys that will be stored on the electronic chip of the label 4.

This module 6 may be an electronic circuit card inserted in a computer or take the form of an external electronic module. Alternatively, it may be a non-material or SSM (Software Security Module) type module of software type although a module 6 of hardware type provides a higher level of security. In all cases, a module 6 of this kind—also termed a platform—makes it possible to address the strictest international standards in terms of security. In other words, the module 6 makes it possible to generate and to manage cryptographic keys intended for the RFID label.

One mode of use of the system is described now with reference to FIG. 1.

In a first step the module 6 exchanges data with the database 1 hosted in the cloud 2 in a secure manner and therefore an encrypted and copy-protected manner, via a cable or other connection, illustrated by the double-headed arrow F. In particular, this exchange makes it possible to collect information relating to the digital contents available in the database, to the roles and to the rights linked to access to the database, i.e. to the type of user (administrator, user, reader, etc.) and their prerogatives.

On the basis of this exchange, in a second data exchange step illustrated by the double-headed arrow F1, the module 6 generates elements necessary for the production and management of the electronic chips incorporated in the label 4. This means, among other things and in a non-limiting manner, life cycles, privileges, certificates, the information content of the chip, conditions governing access to the public and private data of the chip.

The RFID label is then attached to the medium 5, either by sticking it on or by virtue of being incorporated into a constituent element of the medium.

There is obtained in this way a member, here passive, the label 4, that contains information relating to the content situated on the medium 5 and to its use.

Clearly as an alternative the first and second steps are carried out simultaneously or in a different order, the exchanges between the module 6 and the label 4 then being carried out first.

When a user wishes to read a file, either by downloading at least one file containing audio data to their reading means 3 or by streaming, and therefore in read mode only, they connect their reading means 3 to the label 4 fixed to the medium 5, as shown by the double-headed arrow F2. Information concerning the access of that user to the medium, which is predefined, is therefore transmitted to the reading means which, in parallel with this, are connected as shown by the double-headed arrow F3 to the database 1. There is therefore an exchange between the label 4, and therefore de facto between the content of the medium 5, and the database 1 via the reading means 3.

The latter, following identification and where applicable payment, collects the file containing the digitized audio data that corresponds to the content of the medium. The user then profits from nomadic listening with digital quality to the content originally associated with the physical medium.

It is clear that a system of this kind enables great flexibility of use and of application. By way of nonlimiting examples, there may be cited free of charge access over a given period to a file containing audio data, or to a part of that file, from a physical medium located in a store, for example a demonstration CD or a demonstration DVD.

There may equally be access to audio information from an information terminal, or even to image files. Other information may be accessible via this system even if not originally associated with the physical medium. This refers for example to access to translations of the original audio file, information on the author of the audio file, other interpretations of the audio file or audio files linked to the file being listened to.

Moreover, a system of this kind is easily connected to a paid for or online sales service. It also makes it possible to optimize listening to audio data of the file by collecting statistical information on listening to the file. In other words, authors' rights management is facilitated.

The invention claimed is:

1. A system for associating at least one physical medium (5), said physical medium (5) containing at least non-digital audio data, with a database (1) for storing digital data, the system comprising:

a management and control module (6) directly in encrypted electronic communication with the database (1) to exchange encrypted data and adapted to generate and manage cryptographic keys stored in a member (4), said member being an Radio Frequency Identification (RFID) type label and affixed to said physical medium (5), said physical medium being a vinyl disk, and the cryptographic keys further storing information transferred by the management and control module (6) necessary for accessing the digital data, including at least digital audio data stored in said database (1);

the database (1) storing digital data, including the digital audio data corresponding to the information stored in the RFID type label, said digital audio data being a digital version of the non-digital audio data contained within the vinyl disk (5);

means (3) for reading said RFID type label to access the digital data in the database (1), including at least the digital audio data corresponding to the non-digital audio data of the vinyl disk upon which the RFID type label is affixed, as limited by the cryptographic keys in the RFID type label and for reading the digital audio data upon accessing the database (1) by a cable or wireless link (F3), said means being a smartphone; and wherein the encrypted data exchanged between the management and control module (6) and database (1) includes digital contents of the database, and roles and rights linked to access the database.

2. The system according to claim 1, wherein the means (3) are integral with the database (1).

3. The system according to claim 1, wherein the means (3) are remote from the database (1), the database being hosted in a computing cloud (2).

4. The system according to claim 1, wherein the module (6) is an HSM (Hardware Security Module).

5. The system according to claim 1, wherein the module (6) is an SSM (Software Security Module).

6. The system according to claim 1, wherein the cryptographic keys are stored on an electronic chip of the RFID type label (4).

7. The system according to claim 1, wherein the RFID type label is a NFC (Near Field Communication) type label (4).

* * * * *